United States Patent
Shindo et al.

(10) Patent No.: US 10,606,311 B2
(45) Date of Patent: Mar. 31, 2020

(54) ELECTRONIC DEVICE

(71) Applicant: Panasonic Intellectual Property Management Co., Ltd., Osaka-shi, Osaka (JP)

(72) Inventors: Kenichi Shindo, Osaka (JP); Akira Iwamoto, Osaka (JP); Hitoshi Nakatani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/633,272

(22) Filed: Jun. 26, 2017

(65) Prior Publication Data
US 2017/0293320 A1    Oct. 12, 2017

Related U.S. Application Data

(63) Continuation of application No. PCT/JP2015/005897, filed on Nov. 27, 2015.

(30) Foreign Application Priority Data

Dec. 26, 2014  (JP) .................................. 2014-265973

(51) Int. Cl.
    *G06F 1/16*    (2006.01)
(52) U.S. Cl.
    CPC ............ *G06F 1/1628* (2013.01); *G06F 1/166* (2013.01); *G06F 1/1616* (2013.01); *G06F 1/1637* (2013.01)
(58) Field of Classification Search
    CPC ..... G06F 1/1628; G06F 1/1637; G06F 1/1616
    USPC ..................................................... 361/679.29
    See application file for complete search history.

(56) References Cited

U.S. PATENT DOCUMENTS

| 4,895,231 | A | * | 1/1990 | Yamaguchi | ........... | G06F 1/1616 |
| | | | | | | 16/444 |
| 4,951,241 | A | * | 8/1990 | Hosoi | ........................ | B41J 3/36 |
| | | | | | | 361/679.09 |
| 6,115,883 | A | * | 9/2000 | Um | ........................ | F16M 11/10 |
| | | | | | | 16/405 |
| 7,298,610 | B2 | * | 11/2007 | Kim | ...................... | G06F 1/1616 |
| | | | | | | 248/918 |

(Continued)

FOREIGN PATENT DOCUMENTS

| JP | 4-115754 U | 10/1992 |
| JP | 6-004176 | 1/1994 |

(Continued)

*Primary Examiner* — Rockshana D Chowdhury
(74) *Attorney, Agent, or Firm* — Hamre, Schumann, Mueller & Larson, P.C.

(57) ABSTRACT

Laptop computer according to the present disclosure includes a first housing provided with a display, a second housing provided with an operating portion, and a hinge that connects a first side on a rear of the first housing in a length direction and a second side of the second housing such that the first housing and the second housing are capable of relative rotation. The second housing has a leg capable of protruding rearward of the second side from the second side. A shape of a section in the second side connected to the leg is set such that, when the leg is protruded rearward of the second side, a rear end of the leg protrudes downward from a vertical position of a mounted face which is a main face of the second housing opposite to a main face on which the operating portion is provided.

4 Claims, 9 Drawing Sheets

(56) References Cited

U.S. PATENT DOCUMENTS

| | | | |
|---|---|---|---|
| 7,566,043 B2* | 7/2009 | Chen | G06F 1/1616 |
| | | | 248/188.2 |
| 7,936,562 B2* | 5/2011 | Nagamura | G06F 1/1616 |
| | | | 16/429 |
| 2008/0117603 A1* | 5/2008 | Henry | H05K 7/1409 |
| | | | 361/740 |
| 2009/0147469 A1* | 6/2009 | Chen | G06F 1/1616 |
| | | | 361/679.55 |
| 2010/0053888 A1 | 3/2010 | Nagamura et al. | |
| 2010/0290179 A1 | 11/2010 | Hsu | |
| 2010/0301717 A1* | 12/2010 | Wang | G06F 1/1616 |
| | | | 312/223.1 |
| 2011/0222238 A1* | 9/2011 | Staats | G06F 1/1632 |
| | | | 361/679.55 |
| 2012/0212924 A1 | 8/2012 | Nakajima | |
| 2014/0218855 A1 | 8/2014 | Fujino et al. | |

FOREIGN PATENT DOCUMENTS

| | | |
|---|---|---|
| JP | 8-227335 | 9/1996 |
| JP | 2010-086527 A | 4/2010 |
| JP | 2010-267261 | 11/2010 |
| JP | 2012-173878 | 9/2012 |
| JP | 2014-152837 A | 8/2014 |
| JP | 2014-156890 | 8/2014 |

\* cited by examiner

ELECTRONIC DEVICE

BACKGROUND

1. Technical Field

The present disclosure relates to an electronic device having a first housing and a second housing which are connected to each other so as to be capable of relative rotation.

2. Description of Related Art

Unexamined Japanese Patent Publication No. 2014-156890 discloses a laptop computer (electronic device) including a first housing provided with a display, a second housing provided with an operating portion such as a keyboard, and a hinge that connects the first housing and the second housing so as to be capable of relative rotation. The electronic device disclosed in Unexamined Japanese Patent Publication No. 2014-156890 has a leg on a second main face (mounted face) of the second housing opposite to a first main face provided with the operating portion, the leg being capable of protruding from the second main face in a direction substantially perpendicular to the second main face.

SUMMARY

An electronic device according to the present disclosure includes a first housing provided with a display, a second housing provided with an operating portion, and a hinge that connects a first side on a rear of the first housing in a length direction and a second side of the second housing such that the first housing and the second housing are capable of relative rotation. The second housing has a leg capable of protruding rearward of the second side. A shape of a section in the second side connected to the leg is set such that, when the leg is protruded rearward of the second side, a rear end of the leg protrudes downward from a vertical position of a mounted face which is a main face of the second housing opposite to a main face on which the operating portion is provided.

According to the present disclosure, a supporting region of the electronic device can be widened rearward by protruding the leg rearward of the second side from the second side, when the second housing is mounted on a mounting face of a desk or the like and the first housing is rotated to be opened up relative to the second housing. Thus, a mounting state of the electronic device while in operation can be stabilized.

DETAILED DESCRIPTION

Exemplary embodiments will be described below in detail with reference to the drawings appropriately. However, detailed descriptions more than necessary might sometimes be omitted. For example, detailed descriptions of already known items and duplicated descriptions of substantially identical configurations might sometimes be omitted. Such omissions are for preventing following description from becoming redundant more than necessary, and for helping those skilled in the art easily understand the following description.

Note that the attached drawings and the following description are provided for those skilled in the art to fully understand the present disclosure, and are not intended to limit the subject matter as described in the appended claims.

First Exemplary Embodiment

A first exemplary embodiment will be described below with reference to the drawings.

[1. Configuration]

Figure 1:
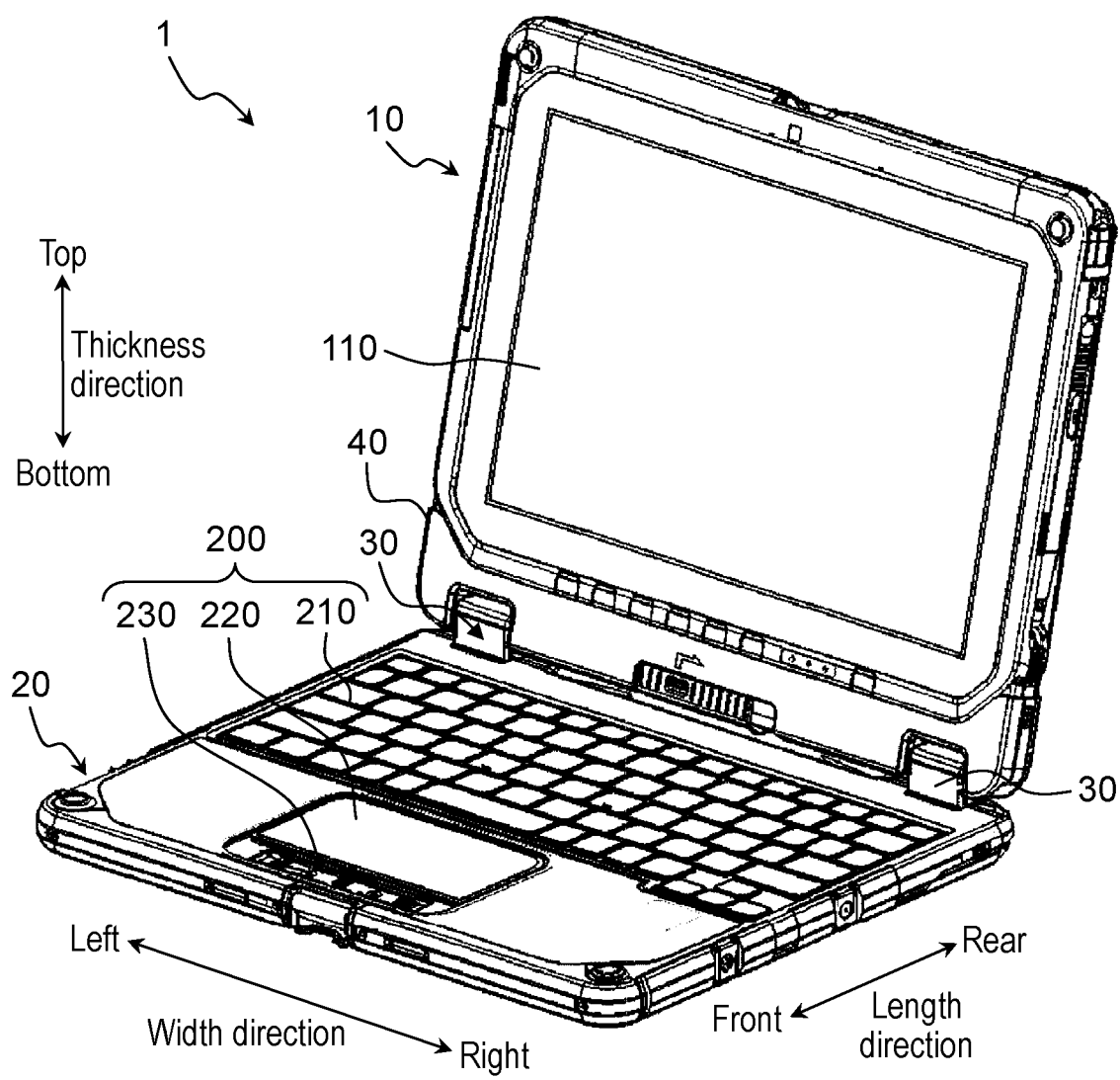
FIG. 1 is a front perspective view of a laptop computer according to a present exemplary embodiment.

FIG. 1 is a front perspective view of laptop computer 1 according to the present exemplary embodiment. FIG. 1 illustrates an external appearance when laptop computer 1 is opened. In the description below, "front" and "rear" are used in terms of a length direction of laptop computer 1, "top" and "bottom" are used in terms of a thickness direction, and "left" and "right" are used in terms of a width direction.

As illustrated in FIG. 1, laptop computer 1 includes first housing 10, second housing 20, and hinge 30. Hinge 30 connects a side (first side 10S (see FIG. 2B)) of first housing 10 on the rear in a length direction and one side (second side 20S (see FIGS. 3A and 3B)) of second housing 20 such that second housing 20 and first housing 10 are capable of relative rotation. Display 110 is provided on a main face of first housing 10. Display 110 is, for example, a liquid crystal display (LCD) panel. Display 110 is also a touch panel capable of accepting a touch operation performed by a user. First housing 10 and second housing 20 are formed of, for example, metal such as a magnesium alloy or resin. An upper main face (upper face) in a thickness direction of second housing 20 is provided with operating portion 200 including keyboard 210, touch pad 220, a plurality of operation buttons 230, and the like. A main face (lower face) opposite to the upper main face of second housing 20 serves as a mounted face facing a mounting face of a desk or the like, when laptop computer 1 is placed on the mounting face.

Laptop computer 1 in the present exemplary embodiment is configured such that first housing 10 and second hosing 20 are separable.

Figure 2A:
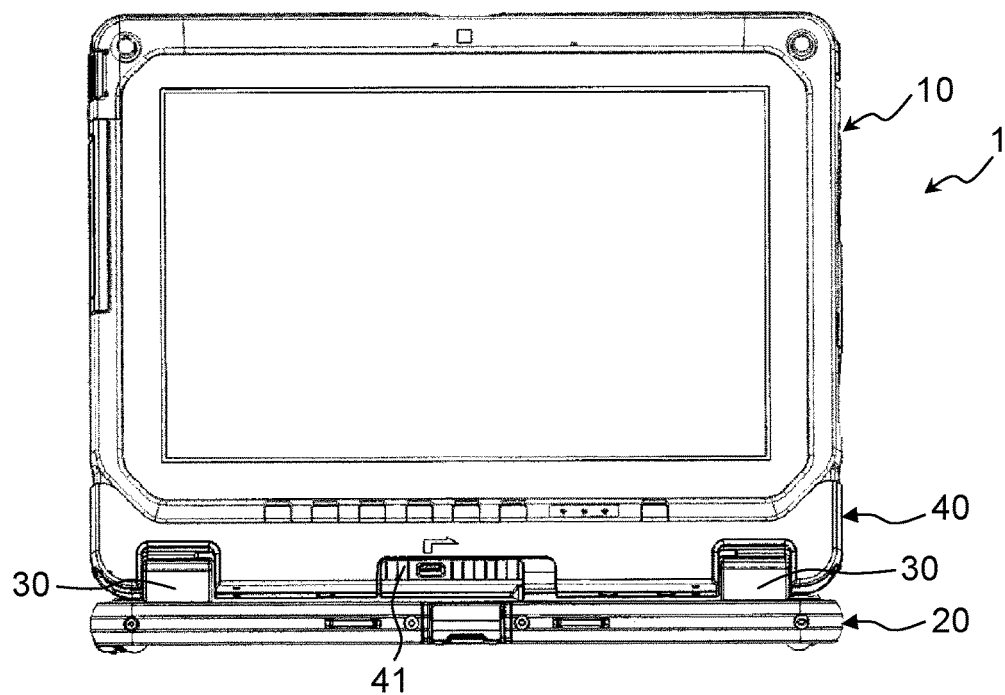
FIG. 2A is a front view of the laptop computer according to the present exemplary embodiment.
Figure 2B:
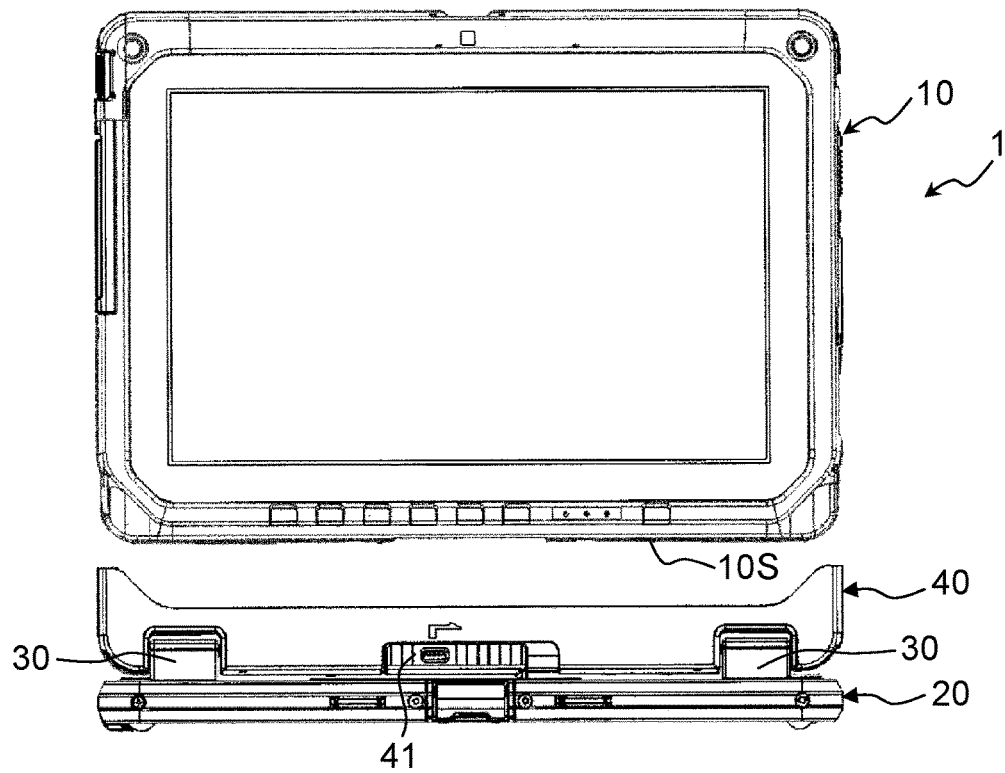
FIG. 2B is a front view of the laptop computer according to the present exemplary embodiment.

FIGS. 2A and 2B are front views of laptop computer 1 according to the present exemplary embodiment. FIG. 2A illustrates a state in which first housing 10 and second housing 20 are connected to each other through hinge 30, and FIG. 2B illustrates a state in which first housing 10 and second housing 20 are separated from each other.

Hinge 30 of laptop computer 1 according to the present exemplary embodiment has socket 40 with which first side 10S of first housing 10 is engageable. Socket 40 has a boat shape with an open top. Slide switch 41 is provided on the center of socket 40 in a longer direction (width direction), and first housing 10 can be removed from socket 40 by sliding slide switch 41, as illustrated in FIG. 2B. Removed first housing 10 can be used as a tablet computer. For this end, laptop computer 1 according to the present exemplary embodiment has, inside first housing 10, a processing unit such as a central processing unit (CPU), storage devices (recording devices) such as a random access memory (RAM), a read only memory (ROM), and a solid state drive (SSD), a battery, and the like.

In a laptop computer in which a first housing provided with a display and a second housing provided with an operating portion are inseparable, a CPU, a RAM, a ROM, an SSD, a battery, and the like are often incorporated in the second housing. On the other hand, in a configuration in which first housing 10 is usable as a tablet computer as in laptop computer 1 in the present exemplary embodiment, first housing 10 needs to include inside a CPU, a RAM, a ROM, an SSD, a battery, and the like as described above, resulting in an increase in weight of first housing 10. Therefore, when first housing 10 is opened up as illustrated in FIG. 1, the center of gravity position of laptop computer 1 is raised. Thus, when an operation such as a typing operation to keyboard 210 or a touch operation on display 110 is performed to laptop computer 1 while laptop computer 1 is placed on the mounting face of a desk or the like, a front end of second housing 20 may be lifted to cause rattling of laptop computer 1 relative to the mounting face, leading to an unstable mounting state. To address this problem, in the present exemplary embodiment, laptop computer 1 is provided with leg 50 capable of protruding rearward (to the rear as viewed from a user using laptop computer 1) from second side 20S of second housing 20 as illustrated in FIGS. 3A and 3B.

Figure 3A:
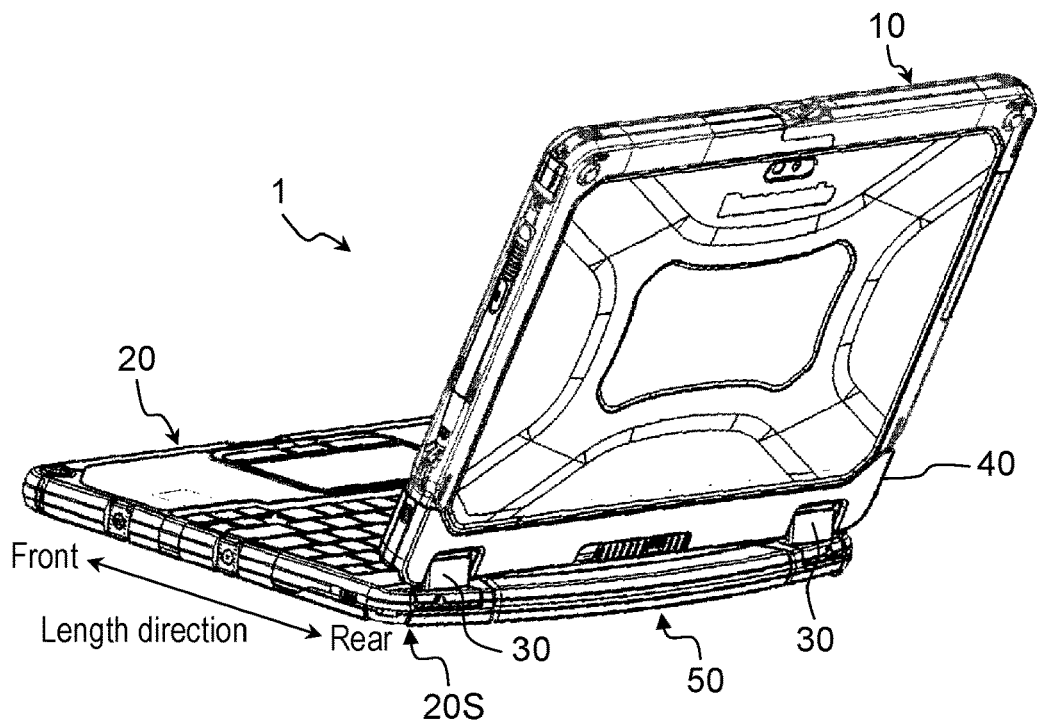
FIG. 3A is a back perspective view of the laptop computer according to the present exemplary embodiment.
Figure 3B:
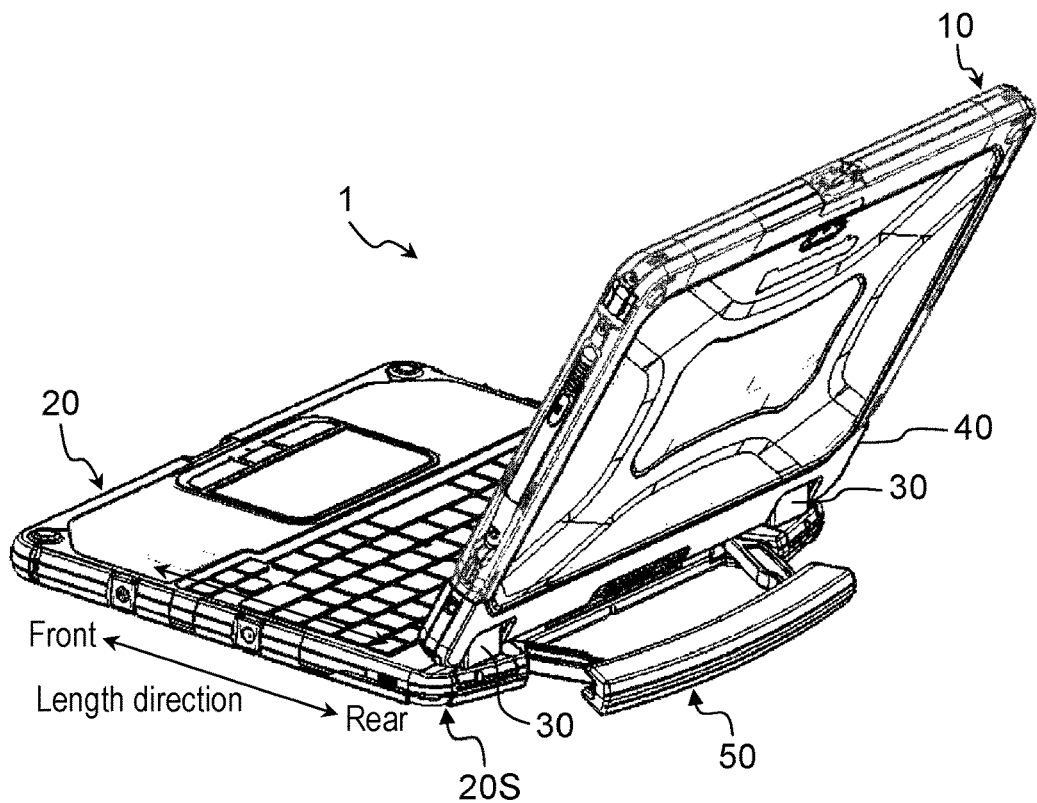
FIG. 3B is a back perspective view of the laptop computer according to the present exemplary embodiment.

FIGS. 3A and 3B are back perspective views of laptop computer 1 according to the present exemplary embodiment. Specifically, FIG. 3A illustrates a state (hereinafter referred to as a "housed state" as appropriate) where leg 50 is housed, and FIG. 3B illustrates a state (hereinafter referred to as a "developed state" as appropriate) where leg 50 is drawn.

Figure 4A:
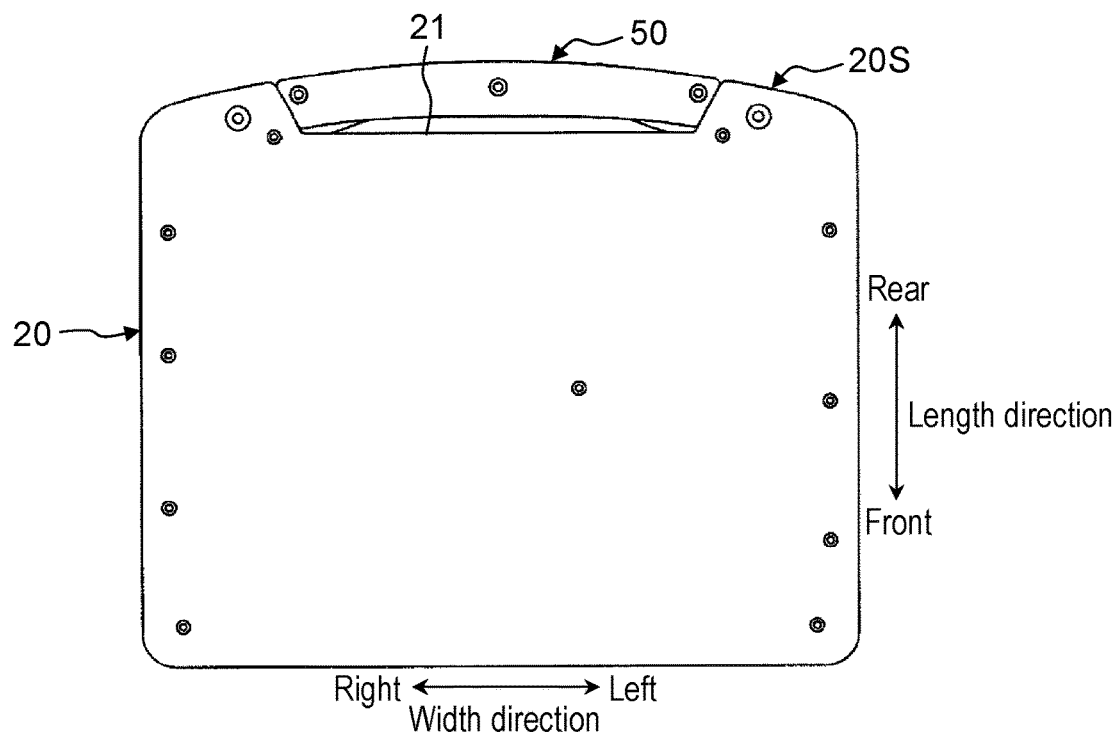
FIG. 4A is a back view of the laptop computer according to the present exemplary embodiment.
Figure 4B:
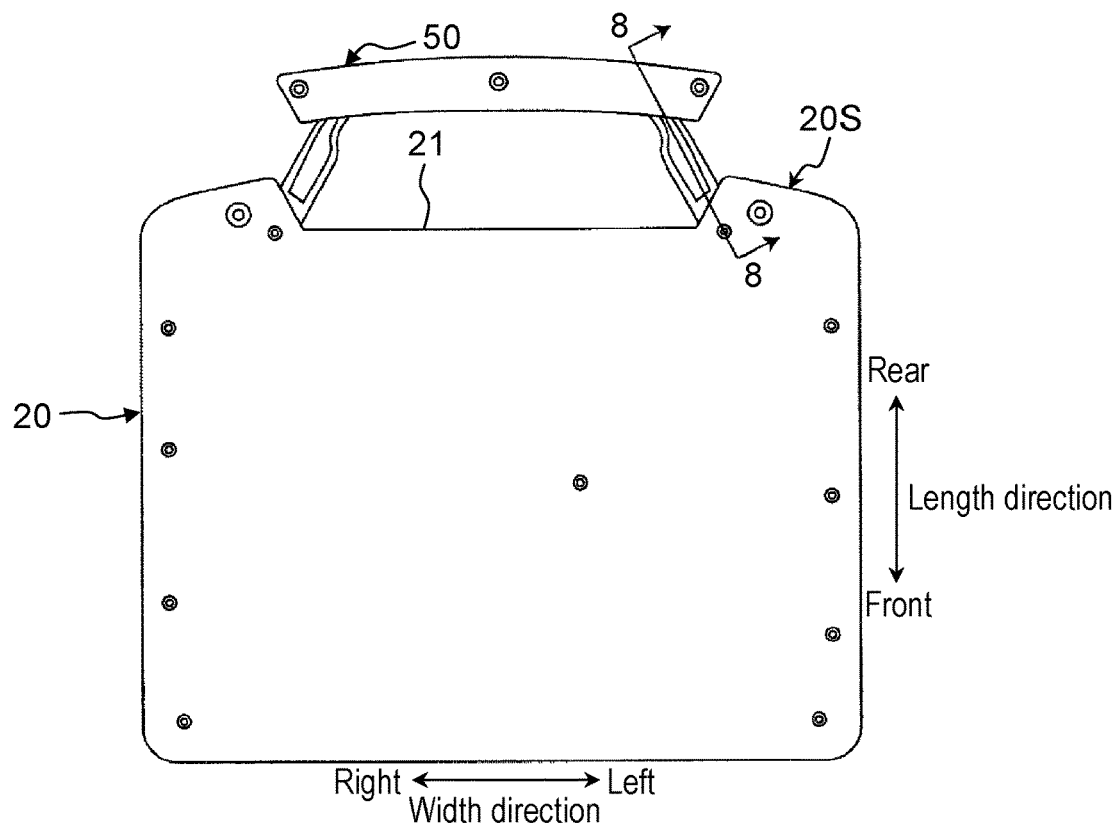
FIG. 4B is a back view of the laptop computer according to the present exemplary embodiment.

FIGS. 4A and 4B are back views of laptop computer 1 according to the present exemplary embodiment. Specifically, FIG. 4A illustrates a state where leg 50 is housed, and FIG. 4B illustrates a state where leg 50 is drawn. As illustrated in FIGS. 4A and 4B, second side 20S of second housing 20 is formed with recess 21, and leg 50 is housed in recess 21 on second side 20S in the housed state. On the other hand, in the developed state, leg 50 protrudes rearward from second side 20S of second housing 20.

Figure 5A:
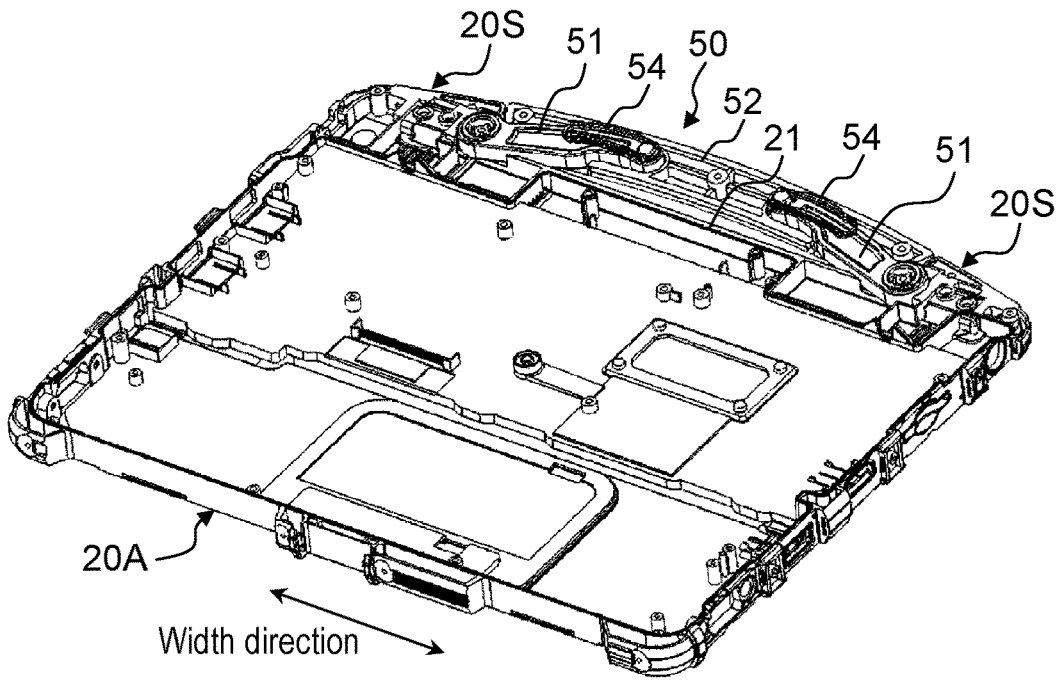
FIG. 5A is a perspective view of an upper housing and a leg of the laptop computer according to the present exemplary embodiment as viewed from diagonally above on an inner side.
Figure 5B:
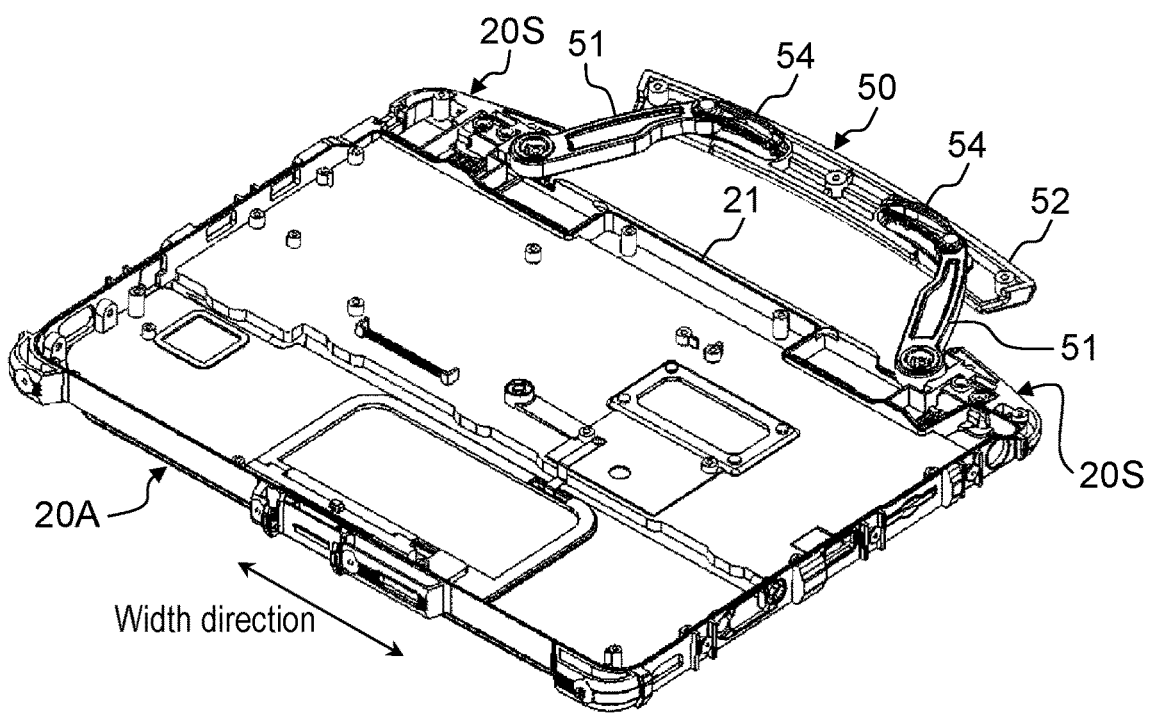
FIG. 5B is a perspective view of the upper housing and the leg of the laptop computer according to the present exemplary embodiment as viewed from diagonally above on the inner side.

FIGS. 5A and 5B are perspective views of upper housing 20A and leg 50 of laptop computer 1 according to the present exemplary embodiment as viewed from diagonally above on an inner side. Specifically, FIG. 5A illustrates the state where leg 50 is housed, and FIG. 5B illustrates the state where leg 50 is drawn. Leg 50 has a pair of left and right link members 51 and leg member 52. Each of link members 51 is a rod-shaped member.

Leg member 52 is a rod-shaped (plate-shaped) member which is long in the width direction of laptop computer 1. Leg member 52 also has a shape and size which enable a user to grip leg member 52. Therefore, the user can carry laptop computer 1 in one hand. Although FIGS. 5A and 5B only illustrate upper leg member 52, leg 50 has lower leg member 52 (see FIG. 8) with a shape vertically symmetrical to upper leg member 52.

A pair of link members 51 is connected, on one end of each of link members 51, to second side 20S of upper housing 20A of second housing 20 so as to be rotatable with a predetermined space formed between link members 51 in the longer direction (width direction of laptop computer 1) of second side 20S. In addition, another end of one of link members 51 is connected to one end of leg member 52 so as to be slidable in the longer direction of leg member 52, and another end of other link member 51 is connected to another end of leg member 52 so as to be slidable in the longer direction of leg member 52.

Figure 6A:
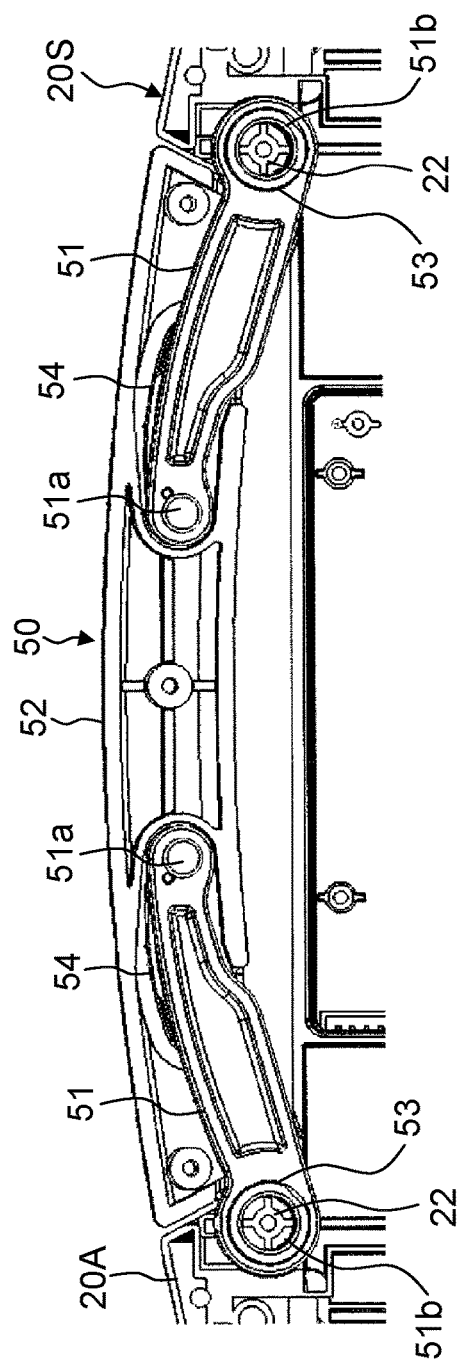
FIG. 6A is an enlarged plan view of the upper housing and the leg of the laptop computer according to the present exemplary embodiment as viewed from the inner side.
Figure 6B:
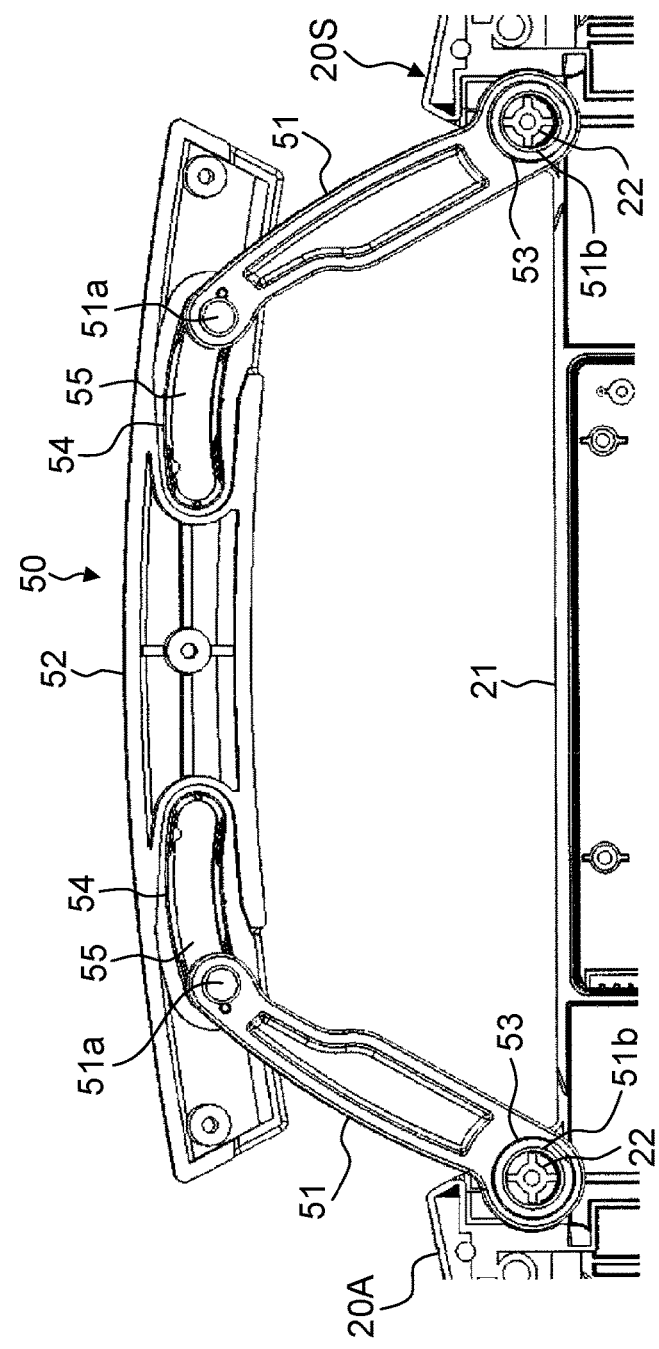
FIG. 6B is an enlarged plan view of the upper housing and the leg of the laptop computer according to the present exemplary embodiment as viewed from the inner side.

This will be described more specifically. FIG. 6A is an enlarged plan view of upper housing 20A and leg 50 of laptop computer 1 according to the present exemplary embodiment as viewed from an inner side (housed state). FIG. 6B is an enlarged plan view of upper housing 20A and leg 50 of laptop computer 1 according to the present exemplary embodiment as viewed from the inner side (developed state).

Figure 7A:
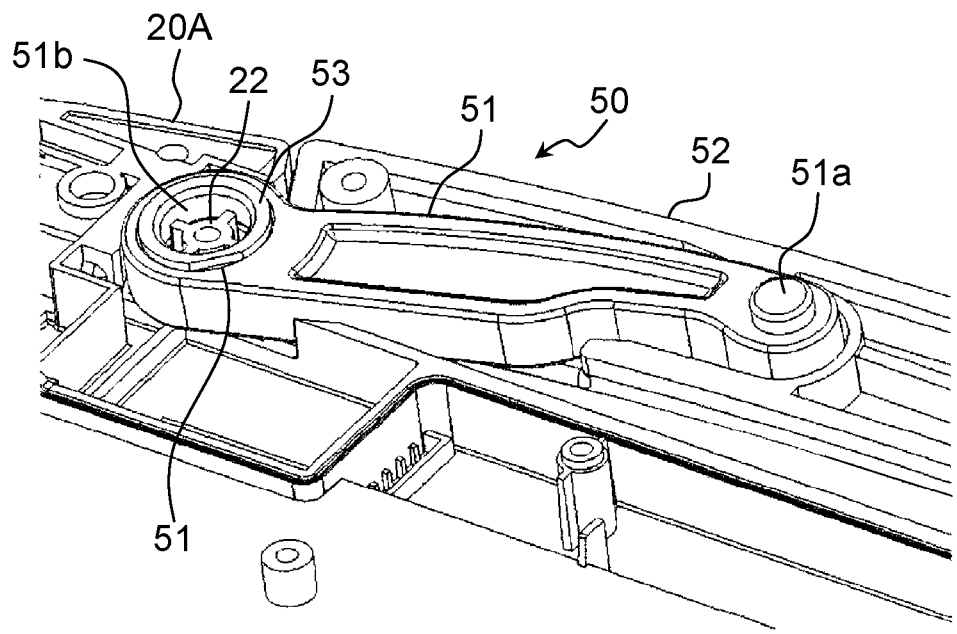
FIG. 7A is an enlarged perspective view of the upper housing and the leg of the laptop computer according to the present exemplary embodiment as viewed from diagonally above on the inner side.
Figure 7B:
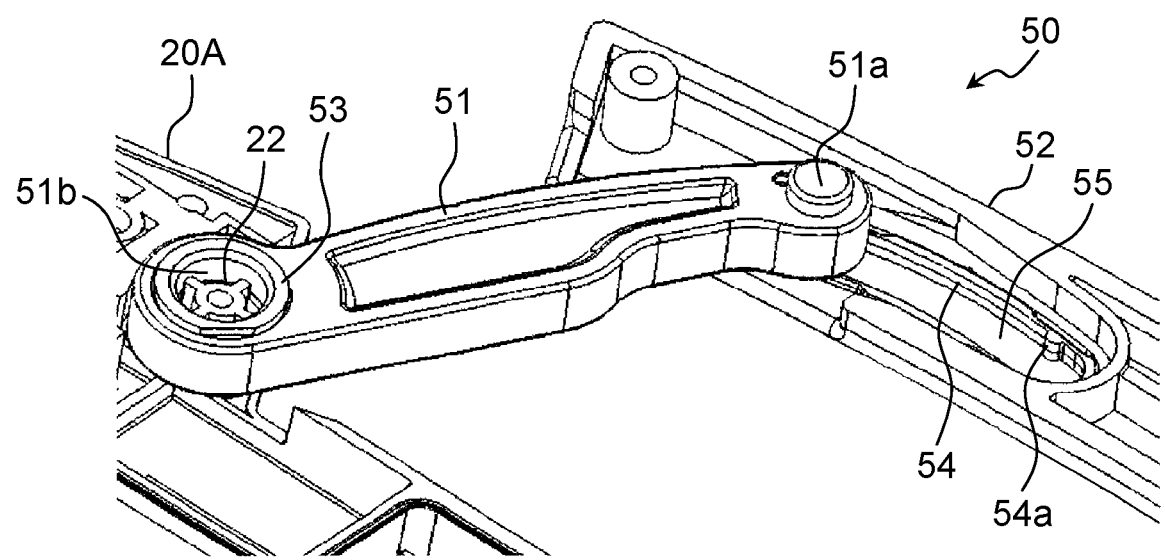
FIG. 7B is an enlarged perspective view of the upper housing and the leg of the laptop computer according to the present exemplary embodiment as viewed from diagonally above on the inner side.

FIG. 7A is an enlarged perspective view of upper housing 20A and leg 50 of laptop computer 1 according to the present exemplary embodiment as viewed from diagonally above on the inner side (housed state). FIG. 7B is an enlarged perspective view of upper housing 20A and leg 50 of laptop computer 1 according to the present exemplary embodiment as viewed from diagonally above on the inner side (developed state).

Columnar projection 51a projecting in the thickness direction is formed on the end of link member 51 close to leg member 52. Note that projection 51a is formed both on an upper side and a lower side in the thickness direction of laptop computer 1 (see FIG. 8). Frame member 54 is attached to an inner surface of each of upper and lower leg members 52 (see FIG. 8). FIGS. 5A and 5B illustrate both of upper and lower frame members 54, while FIGS. 6A, 6B, 7A, and 7B illustrate only upper frame member 54.

As illustrated in these views, frame member 54 has an elongated oval shape along the longer direction of leg member 52 to form groove 55 with which projection 51a on link member 51 can be engaged. Projection 51a on link member 51 can slide along groove 55 on frame member 54 as being engaged with groove 55. Thus, link member 51 can rotate about rotation shaft 22 on upper housing 20A, while the end of link member 51 close to leg member 52 moves along groove 55 in frame member 54. Thus, leg 50 can be in the housed state illustrated in FIGS. 6A and 7A and in the developed state illustrated in FIGS. 6B and 7B. Note that protrusion 54a is formed on an inner end of frame member 54. When projection 51a on link member 51 is located on an inner end of frame member 54, protrusion 54a abuts on projection 51a on link member 51 from an external end side to restrict the movement of projection 51a toward the external end of frame member 54 and to hold leg 50 in the housed state. This restriction is released when force beyond a specified level is applied to projection 51a on link member 51 toward the external end of frame member 54.

Figure 8:
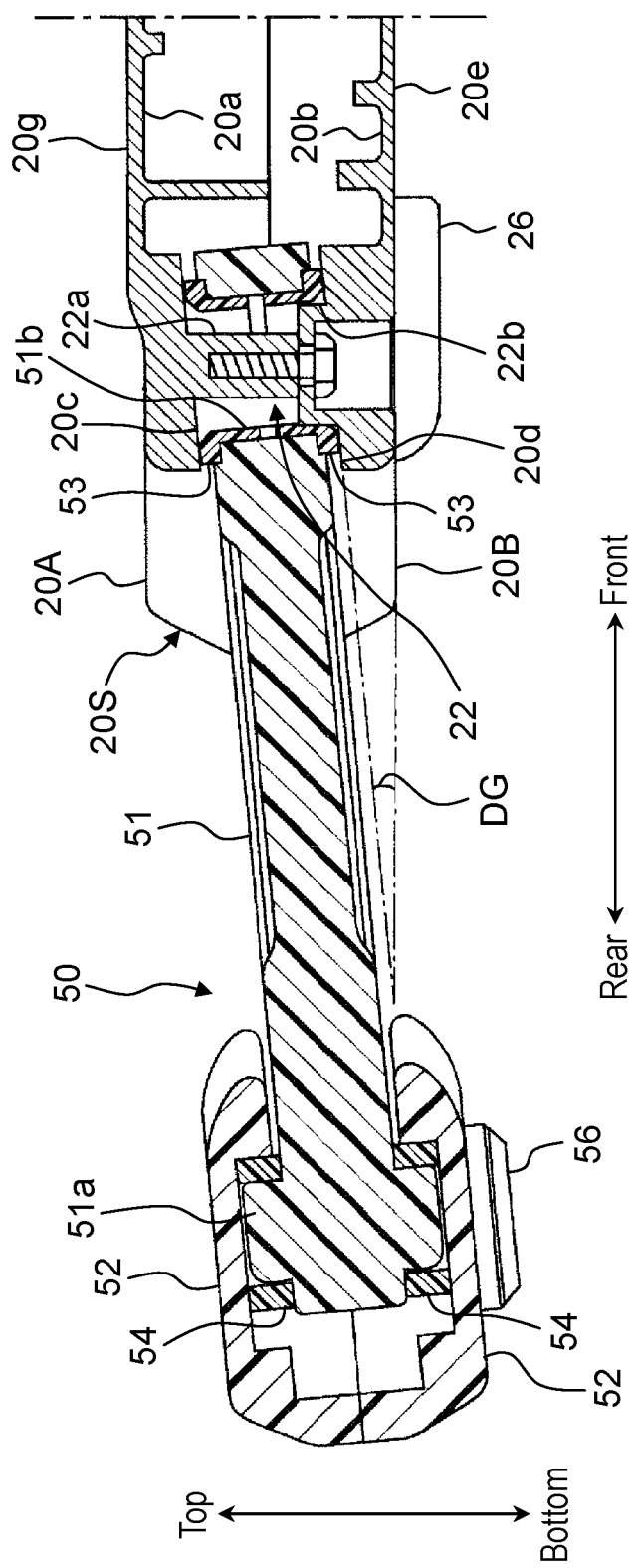
FIG. 8 is a cross-sectional view taken along line 8-8 in FIG. 4B.

FIG. 8 is a cross-sectional view taken along line 8-8 in FIG. 4B. As illustrated in FIG. 8, leg rubber member 56 is provided on the lower surface of lower leg member 52. Screw receiving boss 22a projects from an inner surface of first main wall 20a constituting main face 20g (upper face) of upper housing 20A so as to be perpendicular relative to main face 20g. Screw receiving boss 22b is formed on an inner surface of second main wall 20b constituting mounted face 20e of lower housing 20B so as to be perpendicular relative to mounted face 20e. Through-hole 51b penetrating in the thickness direction of laptop computer 1 is formed on the end of link member 51 close to second side 20S. The inner periphery of through-hole 51b is constituted by resinous cylindrical member 53. The outer diameter of screw receiving boss 22b is set to be almost equal to the inner diameter of cylindrical member 53. Screw receiving bosses 22a and 22b are inserted into through-hole 51b, so that link member 51 is rotatable about screw receiving bosses 22a and 22b. Screw receiving bosses 22a and 22b constitute rotation shaft 22 serving as a rotation shaft of link member 51.

The end of link member 51 close to second side 20S is sandwiched so as to be slidable between first face 20c of first main wall 20a around rotation shaft 22 and second face 20d of second main wall 20b around rotation shaft 22. First face 20c and second face 20d tilt downward and rearward (tilt downward toward the rear) relative to mounted face 20e. In addition, tilt angle DG relative to mounted face 20e is set to an angle by which the rear end of leg 50 protrudes downward from mounted face 20e of second housing 20. Tilt angle DG is 4 degrees to 5 degrees, for example. Notably, tilt angle DG may be set, as appropriate, according to the protrusion amount of link member 51 toward the rear from the rear end of second side 20S, a mounting height of link member 51 to second side 20S, and the like. Specifically, the shape of the section (rotation shaft 22, first face 20c, and second face 20d) connected to leg 50 on second side 20S is set such that the rear end of leg 50 protrudes downward from the vertical position of mounted face 20e of second housing 20.

[2. Action]

Figure 9A:
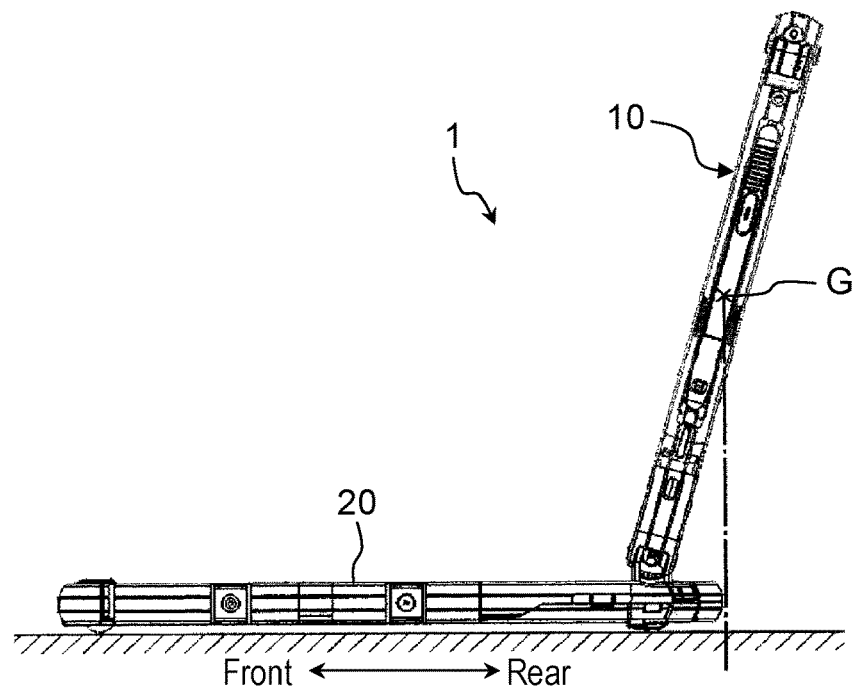
FIG. 9A is a side view of the laptop computer according to the present exemplary embodiment.
Figure 9B:
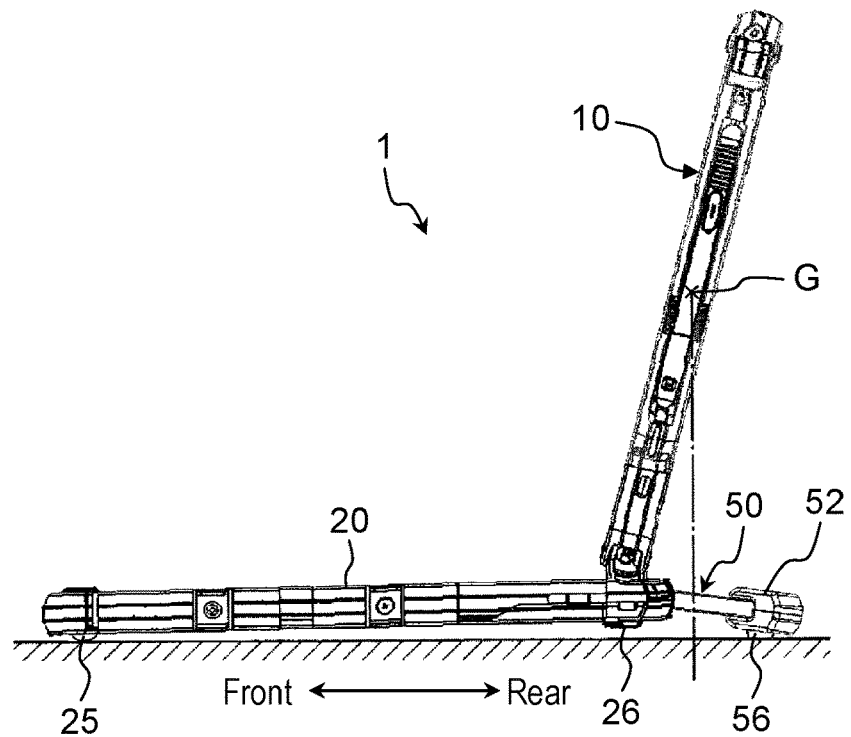
FIG. 9B is a side view of the laptop computer according to the present exemplary embodiment.

FIGS. 9A and 9B are side views of laptop computer 1 according to the present exemplary embodiment. FIG. 9A illustrates the state where leg 50 is housed, and FIG. 9B illustrates the state where leg 50 is developed.

As illustrated in FIG. 9A, in a state where first housing 10 is opened up (opened) to a predetermined use state, center of gravity G of first housing 10 is on a position rearward from the rear end of second housing 20. Therefore, when a touch operation is performed on the display on first housing 10 with this state, backward force is exerted on first housing 10, so that the front end of second housing 20 may be lifted from the mounting face to cause an unstable mounting state.

However, in laptop computer 1 according to the present exemplary embodiment, due to the development and rearward protrusion of leg 50, center of gravity G of first housing 10 is located on a position frontward from the rear end of leg 50, even in the state where first housing 10 is opened up (opened) to a predetermined use state, as illustrated in FIG. 9B. Thus, even if backward force is applied to first housing 10 due to a touch operation performed on first housing 10 with this state, this force is received by leg 50, and thus laptop computer 1 is prevented from being in an unstable mounting state.

In addition, in the present exemplary embodiment, since first face 20c and second face 20d of second housing 20 tilt downward and rearward (tilt downward toward the rear) relative to mounted face 20e, link member 51 of leg 50 tilts downward and rearward relative to mounted face 20e. Therefore, laptop computer 1 is in contact with the mounting face on two points which are leg rubber member 25 provided on a front end of mounted face 20e of second housing 20 and leg rubber member 56 on the bottom face of leg member 52 of leg 50. Thus, the mounting state of laptop computer 1 while in use is stabilized. If lower surfaces of leg rubber member 25 on second housing 20, leg rubber member 26 on second housing 20, and leg member 52 of leg 50 are not on the same plane due to dimensional errors or the like with link member 51 not tilting relative to mounted face 20e, only two of three members which are leg rubber member 25 on second housing 20, leg rubber member 26 on second housing 20, and leg member 52 of leg 50 are in contact with the mounting face. In this case, in use of laptop computer 1, two of the three members are in contact with the mounting face in different combinations of the three members in a switching manner, so that laptop computer 1 is likely to rattle. That is, the mounting state is likely to be unstable. Note that leg rubber member 25, leg rubber member 26, and leg rubber member 56 may be formed from a material such as resin in place of rubber.

[3. Effects and the Like]

Laptop computer 1 according to the present exemplary embodiment includes first housing 10 provided with display 110, second housing 20 provided with operating portion 200, and hinge 30 that connects first side 10S on a rear of first housing 10 in a length direction and second side 20S on a rear of second housing 20 such that first housing 10 and second housing 20 are capable of relative rotation. Second housing 20 has leg 50 capable of protruding rearward of second side 20S from second side 20S.

According to this configuration, a supporting region of laptop computer 1 can be widened rearward by protruding leg 50 rearward of second side 20S from second side 20S, when second housing 20 is mounted on a mounting face and first housing 10 is rotated to be opened up relative to second housing 20. Therefore, even when backward force is applied to first housing 10 due to a touch operation performed on display 110 on first housing 10, for example, a load is received by leg 50. Thus, a mounting state of laptop computer 1 while in operation can be stabilized.

In the present exemplary embodiment, the shape of a section (rotation shaft 22, first face 20c, and second face 20d) in second side 20S connected to leg 50 is set such that, when leg 50 is protruded rearward of second side 20S, a rear end of leg 50 protrudes downward from a vertical position of mounted face 20e which is a main face of second housing 20 opposite to main face 20g on which operating portion 200 is provided.

Thus, when leg 50 is protruded rearward of second side 20S, the rear end of leg 50 protrudes downward from the vertical position of mounted face 20e of second housing 20. Accordingly, with leg 50 being protruded, laptop computer 1 is in contact with the mounting face on two points in a front-rear direction of laptop computer 1, that is, on a front end of mounted face 20e of second housing 20 and another end (rear end) of link member 51. When the rear end of leg 50 does not protrude downward from the vertical position of mounted face 20e of second housing 20, and the mounted face of second housing 20 protrudes most downward due to dimensional errors or the like, for example, laptop computer 1 may rattle when being placed on the mounting face. However, in the present exemplary embodiment, laptop computer 1 is in contact with the mounting face on two points in the front-rear direction, thus an occurrence of rattling can be prevented.

In the present exemplary embodiment, leg 50 has a rod-shaped leg member 52 and a pair of link members 51 that connects leg member 52 and second side 20S of second housing 20 to each other. A pair of link members 51 is connected, on one end of each of link members 51, to second side 20S of second housing 20 so as to be rotatable with a predetermined space formed between link members 51 in a longer direction of second side 20S. Another end of one of link members 51 is connected to one end of leg member 52 so as to be slidable in the longer direction of leg member 52, and another end of other link member 51 is connected to another end of leg member 52 so as to be slidable in the longer direction of leg member 52.

According to this configuration, leg 50 can be configured of rod-shaped leg member 52 and a pair of link members 51 that connects leg member 52 and second side 20S of second housing 20 to each other. In other words, the mounting state of laptop computer 1 while in operation can be stabilized with a simple configuration.

In the present exemplary embodiment, second housing 20 has first main wall 20a constituting main face 20g of second housing 20, second main wall 20b disposed parallel to first main wall 20a with a predetermined space and constituting mounted face 20e of second housing 20; and rotation shaft 22 projecting at least from one main wall 20a toward other main wall 20b.

Each of link members 51 is configured such that through-hole 51b formed on one end of link member 51 is engaged with rotation shaft 22 so that link member 51 is rotatable about the one end, and that the one end is sandwiched so as to be slidable between first face 20c of first main wall 20a around rotation shaft 22 and second face 20d of second main wall 20b around rotation shaft 22.

First face 20c and second face 20d tilt relative to mounted face 20e so that the rear end of leg 50 protrudes downward from the vertical position of mounted face 20e of second housing 20.

According to this configuration, first face 20c and second face 20d are tilted relative to mounted face 20e, so that the rear end of leg 50 can be made to protrude downward from the vertical position of mounted face 20e of second housing 20.

In the present exemplary embodiment, first housing 10 is a tablet computer configured to be detachable to hinge 30.

According to this configuration, even if first housing 10 is a heavy component such as a tablet computer, a mounting state of an electronic device while in use as laptop computer 1 can be stabilized by protruding leg 50 rearward.

Other Exemplary Embodiments

In the exemplary embodiment described above, first housing 10 of the electronic device is a tablet computer which can be separated from second housing 20. However, the present disclosure is also applicable to a general laptop computer in which a first housing cannot be separated from second housing 20.

The exemplary embodiments have been described above and exemplified as the technology of the present disclosure. The accompanying drawings and detailed description have been presented for this purpose.

Accordingly, the components described in the appended drawings and the detailed descriptions include, in order to exemplifying the above described technology, not only essential components, but also components that are not essential. Therefore, it should not immediately be construed that these components that are not essential are essential because the components are described in the appended drawings and the detailed descriptions.

Since the above described exemplary embodiments are for exemplifying the technology of the present disclosure, various modifications, replacements, additions, and omissions can be made within the scope of the appended claims or of their equivalents.

The present disclosure is widely applicable to an electronic device including a first housing provided with a display, a second housing provided with an operating portion such as a keyboard, and a hinge that connects the first housing and the second housing so as to be capable of relative rotation.

What is claimed is:

1. An electronic device comprising:
   a first housing provided with a display;
   a second housing provided with an operating portion; and
   a hinge that connects the first housing and the second housing at a rear relative to a length direction of the first housing and the second housing, the first housing and the second housing being capable of relative rotation,
   wherein the second housing has
   a recess substantially centered at the rear of the second housing relative to the length direction and
   a leg mounted at the rear of the second housing and removably housed in the recess,
   wherein when the leg protrudes rearward from the rear of the second housing, the leg is configured to support the second housing by abutting a surface on which the electronic device rests, at a location rearward of the second housing, and
   wherein when the leg protrudes rearward from the rear of the second housing, a bottom of the second housing at the rear is spaced from the surface on which the electronic device rests.

2. The electronic device according to claim 1, wherein the leg includes:
   a rod-shaped leg member; and
   a pair of link members which connects the rod-shaped leg member and the recess of the rear of the second housing to each other,
   wherein the pair of link members is connected, on one end of each of the pair of link members, to the recess of the rear of the second housing so as to be rotatable with a predetermined space formed between the pair of link members in a longer direction of the rear of the second housing.

3. The electronic device according to claim 1, wherein the first housing is a tablet computer configured to be detachable from the hinge.

4. The electronic device according to claim 1, wherein the leg provides a handle configured to be gripped by a user for carrying the electronic device.

* * * * *